United States Patent
Eiseman, Jr. et al.

[15] 3,686,368
[45] Aug. 22, 1972

[54] PHOSPHONAMIDE ANTISTATIC AGENTS

[72] Inventors: Fred S. Eiseman, Jr., Maplewood; Leslie Millard Schenck, Mountainside, both of N.J.; John P. G. Beiswanger, Easton, Pa.

[73] Assignee: GAF Corporation, New York, N.Y.

[22] Filed: May 18, 1970

[21] Appl. No.: 38,519

[52] U.S. Cl....260/945, 117/138.8 B, 117/139.5 CQ, 260/944
[51] Int. Cl..............................C07f 9/22, C07f 9/24
[58] Field of Search..............................260/945, 944

[56] References Cited

UNITED STATES PATENTS 3,480,594  11/1969  Price......................260/945 X

*Primary Examiner*—Joseph Rebold
*Assistant Examiner*—Richard L. Raymond
*Attorney*—Samson B. Leavitt and Walter C. Kehm

[57] ABSTRACT

New phosphonamides with antistatic properties are provided. The phosphonamides are represented by the formula:

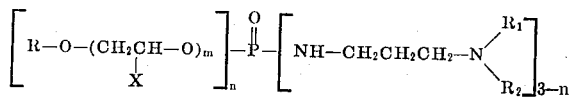

wherein R is an alkyl or alkaryl radical, X is hydrogen, methyl or ethyl, $R_1$ and $R_2$ are individually either alkyl or hydroxyalkyl, $m$ is an integer and n is either 1 or 2. Typically, the compounds of the invention are applied by dipping an article such as a fiber to be coated, into a solution of the phosphonamide in a suitable solvent. A representative antistatic agent of the present invention is prepared by the stepwise reaction of phosphorus oxychloride with an ethoxylated higher straight chain primary alcohol mixture and N,N-dimethylpropylenediamine in sufficient quantities to fully replace all the chlorine.

8 Claims, No Drawings

PHOSPHONAMIDE ANTISTATIC AGENTS

This invention relates to new compounds which function as antistatic agents when coated on polymeric substrates. It relates further to new N-aminopropyl-alkyleneoxyphosphonamides which can be prepared by the reaction of alkyl or alkaryl polyethyleneoxy chlorophosphonates with substituted propylenediamines. It relates still further to the use of such phosphonamides to render polymeric materials resistant to static charge build-up. The compounds of our invention are represented by the general formula (I):

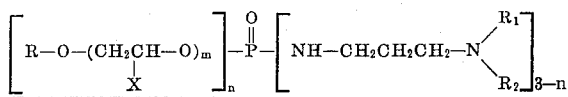

wherein R is an alkyl or alkaryl radical containing at least 7 carbons such heptyl, octyl, decyl, dodecyl, heptadecyl or methylphenyl, nonylphenyl, pentadecyl phenyl and the like, X is hydrogen, methyl or ethyl, $m$ is an integer of from 1 to 10, $n$ is 1 or 2 and each of $R_1$ and $R_2$ is individually a member of the group consisting of alkyl and hydroxyalkyl radicals of 1–3 carbon atoms such as methyl, ethyl, isopropyl, propyl, hydroxyethyl, dihydroxypropyl, etc.

When fibers, especially those prepared from synthetic polymers, are subjected to frictional forces such as those encountered in textile mills during spinning of the fiber into yarn, and weaving of fabric or rugs from the yarn, or during the use of the resultant articles as they are handled, flexed and rubbed, static electricity is generated. The attractive forces exerted upon the charged fibers interfere with their movement through spinning and weaving equipment and cause unwanted dust and line accumulations. Additionally, fabrics which retain their static charge tend to adhere to other surfaces and, in the case of clothing, this presents an unsightly appearance which detracts from the value thereof.

Not all materials generate static electricity equally. Under normal humidity conditions, viscose rayon does not generate static electricity to any great extent. Acetate rayon and wool generate static electricity to such a small extent that the problem can be controlled by maintenance of high humidity in the mill rooms. Polyester, acrylic and vinyl fibers are notoriously efficient static charge generators and it is known to treat them with antistatic agents, generally added to fiber lubricants which are applied to the fiber surfaces during processing. Such antistatic agents are generally not durable and cease to be capable of providing antistatic activity after the fabric is washed.

The problem of finding an effective, durable antistatic agent for synthetic fibers polymers has been extensively investigated. Antistatic agents function in two general ways, both of which improve the electrical conductivity of the fiber surface. They are either reasonably good conductors of electricity themselves or they are hygroscopic and help concentrate atmospheric moisture on the fiber. This latter type includes many of the polyhydroxy and polyethyleneoxy compounds.

The majority of antistatic agents fall into one of the following three structural categories: (1) non-ionic polyhydroxy and polyalkyleneoxy compounds; (2) cationic or neutral nitrogenous compounds with a hydrophobic moiety in their structure, e.g., long chain amines or quaternary ammonium compounds; (3) long-chain phosphates, phosphonates, or other oxygenated phosphorus derivatives. Additional types include sulfonated oils and ester emulsions, and other fiber lubricant emulsions which depend on the particular emulsifying agent used for their antistatic effect.

Long chain quaternary ammonium salts have a marked antistatic action and are widely used in this capacity. These quaternaries are frequently used in combination with auxiliary agents which may themselves be antistatic agents or serve the secondary purpose of binding the finish to the fiber, as disclosed in U. S. Pat. No. 2,463,282. The water insoluble salts of higher amines together with polystyrene sulfonates are described in U. S. Pat. No. 2,700,001 as nylon antistats. Phosphorus compounds with antistatic capacities are described in U. S. Pat. Nos. 2,575,382; 2,575,399, and 2,676,122. Hygroscopic salts, such as cyclohexylamine lactate, are disclosed in German Pat. No. 840,694, while the use of polyethoxylated fatty acids and alcohols as antistatic agents for polypropylene articles as well as fibers is reported in U. S. Pat. No. 2,525,691.

It is a primary object of the present invention to provide a new class of chemical compounds. It is another object of this invention to provide a new class of antistatic agents. It is a further object to provide a means of preventing the accumulation of static electricity on the surfaces of articles prepared from synthetic organic polymers. Still other objects will appear from the following description of this invention.

The compounds of the present invention are represented by the general formula given above. These alkoxylated N-amino-propylphosphonamides show excellent antistatic properties when applied to synthetic fibers. They impart not only the antistatic properties associated with an amide linkage, but also the desirable antistatic characteristics of the polyethoxylated hydrophobe. Unexpectedly the combination of these chemical structures within the phosphonamide molecular structure provides an enhancement of antistatic activity lacking through the simple admixture of nonionic and amide type antistatic agents.

The antistatic agents of the present invention can be applied by dipping, spraying, wiping or brushing a solution or dispersion of the material in a suitable medium. The amount to be applied depends upon the intended use of the article as well as the inherent characteristics of the plastic material. The persistance of the charge on the surface of the plastic is mainly attributable to the fact that plastics have very high surface resistance, in the order of as high as $10^{20}$ ohms per square. The antistatic agent operates by lowering the surface resistance to the point where the static charges are dissipated in a relatively short time. However, since the plastic is essentially nonconductive, electrostatic charges may be distributed quite irregularly over the surface and it is therefore essential that the antistatic agent be applied in sufficient concentration to provide an intact coating over the entire surface. Since the formation of static electricity is essentially a surface phenomenon, the amount of antistatic agent to be applied depends upon the total surface area of the article to be treated rather than its weight. In the case of thin films and high denier fibers, the antistatic coating may constitute 50 percent or more by weight of the coated material. That is to say, if a plastic film of about 1 mil thickness is to be treated and the antistatic agent does not readily form films thinner than about 1 mil, the treated plastic may contain at least 50 percent by weight of antistatic agent. On the other hand, if it is desired to treat a molded article such as a plastic dial face with antistatic agent, the coating may constitute no more than about 0.05 percent by weight of the entire article. Without intending to limit the present invention to named weight proportions of antistatic agent to treated polymer, application rates in the range of about 0.05 percent to 10.0 percent are generally useful in the treatment of fabrics and thin films to impart antistatic properties thereto.

The antistatic agents of the present invention can be used to treat organic polymeric fibers, films or other articles of manufacture to prevent the accumulation of surface static charge. The action of the antistatic agent is independent of the chemical nature of the polymer and any polymer can be treated, including polyesters (e.g., those of phthalic and terephthalic acid with glycols such as ethylene glycol); vinyl polymers (e.g. polyvinyl chloride and polyvinyl alcohol; poly-olefins (e.g. polyethylene and polypropylene; polyamides (e.g. nylon); acrylics (e.g. polymethyl methacrylate and polyacrylo-nitrile; and others such as the polyacetals, the polycarbonates, the polyepoxides, and the like.

The antistatic agents of the present invention form durable coatings on the surface of plastic materials. They have a sufficiently high vapor pressure to be resistant to loss by evaporation under normal conditions. They are not readily removed by dry wiping and they have relatively high resistance to removal by washing with aqueous solutions. By use at relatively high application rates, they can provide protection against static charge build-up for extremely long periods under relatively adverse conditions.

The compounds of Formula I can be prepared by reacting phosphorus oxychloride with an alkoxylated alkanol or alkyl phenol of at least 7 carbons. The resultant chlorophosphonate is in turn reacted with either 1 or 2 moles of an N,N-dialkyl-propylenediamine to thereby replace the chlorine atoms remaining on the phosphonate molecule. The latter reaction is conducted in the presence of an alkaline material to serve as a hydrogen chloride acceptor. The desired product can be obtained in relatively pure form by distillation to remove any water formed during the reaction, and filtration to remove unwanted by-products.

All the reactants are known materials. The alkoxylated alcohol or alkylphenol can be prepared by the reaction of an alkylene oxide such as ethylene oxide or less preferably propyleneoxide, with a higher aliphatic alcohol or an alkylphenol. Among the useful alcohols are the secondary alcohols, such as 2-decanol, 3-decanol, 4-decanol, 3-dodecanol, 4-tetradecanol, 6-hexadecanol and the like, or admixtures of the foregoing. Among the suitable alkylphenols are p-octylphenol, linear p-decylphenol, branched p-dodecylphenol and the like, or mixtures of any of the foregoing alkylphenols. The alkoxylation reaction is conducted in the presence of a catalyst which may be either acidic or basic, and at an elevated temperature, e.g., 120° to 150° C. generally under elevated pressure, e.g., 1 to 30 p.s.i.g. Sufficient alkylene oxide should be charged either at the beginning of the reaction or continually added as the reaction proceeds to make 1 to 10 moles of the oxide available for each mole of alcohol or phenol. The catalysts which can be used are alkaline materials such as sodium hydroxide or potassium hydroxide or acidic catalysts such as boron trifluoride or phosphoric acid. The propylenediamines have one primary and one tertiary amino group. Suitable diamines are N,N-dimethyl-propylenediamine, N,N-diethyl-propylenediamine, N-methyl-N-hydroxyethyl-propylenediamine, N-propyl-N-dihydroxypropyl-propylenediamine and the like.

The effectiveness of antistatic agents is judged on the basis of their ability to reduce the resistivity of the polymers they are used to treat. The test method which was used in evaluating the antistatic agents of this invention is AATCC Standard Test Method 76–1959.

The following Examples are presented to further illustrate the present invention. Therein, unless otherwise stated, parts and percentages are on a weight basis.

EXAMPLE 1 a. To a round bottom flask was charged a total of 288 parts of an ethoxylate of a $C_{12}$–$C_{15}$ straight chain primary alcohol containing 1.85 moles of ethylene oxide. The alcohol mixture was calculated as having an average molecular weight of 209 and the following composition: 5 percent $C_{11}$-alcohols, 25 percent $C_{12}$-alcohols, 30 percent $C_{13}$-alcohols, 30 percent $C_{14}$-alcohols and 10 percent $C_{15}$-alcohols. The ethoxylate was agitated at ambient temperature (20°–30°C.) while 77 parts of phosphorus oxychloride (0.5 mole) were dropped in over about 1.5 to 2.0 hours. After addition of phosphorus oxychloride was completed, the batch was heated to 60°–70° C. and held 1 hour. Then dry nitrogen was bubbled into the vessel to purge it of hydrogen chloride and the temperature was held one hour longer. Samples were then taken at one hour intervals until chlorine analysis showed substitution of two ethoxylate moieties on each phosphorous atom.

b. To a beaker equipped with agitator, two dropping funnels, thermometer and a pH meter were charged 500 ml. of water and 91 gms. of N,N-dimethyl-propylenediamine (0.9 mole). These materials were agitated at room temperature while 591 gms. of the chlorophosphonate (0.9 mole) prepared in (a) and 30% NaOH were dropped in simultaneously over about 1 to 1.5 hours at such a rate as to maintain the pH between 10.5 to 11.0. A total of 130 gms. 30% NaOH was required. After all reactants were added, the batch was agitated 15 minutes at room temperature and then brought to pH 9.0 with CP HCl. A total of 12.0 gms. were required. The product was then stripped of water at 40 mm. pressure and the residue was filtered. The yield was 557 gms. (85.8 percent of theoretical).

c. The phosphonamide formed above was applied from MeOH/$CCl_4$ (520 mls/1000 mls) solvent mixture to nylon faille and Dacron polyester fiber swatches at 1.25 percent application rate according to AATCC standard Test Method 76–1959.

The swatches were conditioned at 72° F. and 50 percent relative humidity for at least 24 hours and the resistivity measured. Results were as follows:

|  | Log Ohms/Square | |
|---|---|---|
|  | Nylon | Polyester |
| Control | 14.02 | 13.46 |
| Phosphonamide | 8.48 | 8.40 |

EXAMPLE 2 a. To a round bottom flask was charged a total of 306 parts (by weight) of an ethoxylated octyl alcohol (4.0 moles of ethylene oxide). The ethoxylate was agitated at ambient temperature (20°–30° C.) while 77 parts of phosphorous oxychloride (0.5 mole) were dropped in over about 1.5 to 2.0 hours. After addition of phosphorous oxychloride was completed the batch was heated to 60°–70° C. and held one hour longer. Samples were taken at 1 hour intervals till percent chlorine on a hydrolyzed sample indicated substitution of two alcohol moieties on each phosphorous atom.

b. To a beaker equipped with agitator, two dropping funnels, thermometer and a pH meter were charged 500 ml. of water and 91 gms. of N,N-dimethyl-propylenediamine (0.9 mole). These materials were agitated at room temperature while 623 gms. of the chlorophosphonate (0.9 mole) prepared in (a) and 30 percent NaOH were dropped in simultaneously over about 1 to 1.5 hours at such a rate as to maintain the pH between 10.0 to 10.5. A total of 108 gms. of 30 percent NaOH was required. After all reactants were added the batch was agitated 15 minutes at room temperature and then brought to pH 9.0 with CP HCl. A total of 13.0 gms. were required. The product was then stripped of water at 40 mm. pressure and the residue was filtered. The yield was 552 gms. (80.9 percent of theoretical).

c. The phosphonamide formed above was applied from MeOH/CCl$_4$ (52.0 mls/1000 mls) solvent mixture to Dacron polyester and nylon faille swatches at 2.5 percent application rate according to AATCC standard Test Method 76–1959.

The swatches were conditioned at 72° F. and 50 percent relative humidity for at least 24 hours and the resistivity measured.
Results were as follows:

|  | Log Ohms/Square | |
|---|---|---|
|  | Polyester | Nylon |
| Control | 13.46 | 14.02 |
| Phosphonamide | 8.86 | 9.10 |

EXAMPLE 3 a. To a round bottom flask was charged a total of 660 parts by weight of an ethoxylate (10.0 moles of ethylene oxide) of nonyl phenol. The ethoxylate was agitated at ambient temperature (20°–30° C.) while 77 parts of phosphorus oxychloride (0.5 mole) were dropped in over about 1.5 to 2.0 hours. After addition of phosphorus oxychloride was completed the batch was heated to 60°–70° C. and held 1 hour. Dry nitrogen was bubbled in to purge the vessel of HCl and the temperature was held one hour longer. Samples were then taken at one hour intervals till percent chlorine on a hydrolyzed sample was theoretical for substitution of 2 moles of the phenol ethoxylate.

b. To a beaker equipped with agitator, two dropping funnels, thermometer and a pH meter were charged 700 ml water and 91 gms N,N-dimethyl-propylenediamine (0.9 mole). These materials were agitated at room temperature while 1260 gms of the chlorophosphonate (0.9 mole) prepared in (a) and 30 percent NaOH were dropped in simultaneously over about 1 to 1.5 hours at such a rate as to maintain the pH between 10.5 to 11.0. A total of 150 gms. of 30 percent NaOH was required. After all reactants were added the batch was agitated 15 minutes at room temperature and then brought to pH 9.0 with CP HCl. A total of 12.0 gms. were required. The product was then stripped of water at 40 mm. pressure and the residue was filtered. The yield was 1053 gms. (79.8 percent of theoretical).

(c) The phosphonamide formed above was applied from MeOH/CCl$_4$ (520 mls/1000 mls) solvent mixture to polypropylene and Dacron polyester swatches at a 1.25 percent application rate according to AATCC Standard Test Method 76–1959.

The swatches were conditioned at 72° F. and 50 percent relative humidity for at least 24 hours and the resistivity measured. Results were as follows:

|  | Log Ohms/Square | |
|---|---|---|
|  | Polypropylene | Polyester |
| Control | 14.64 | 13.46 |
| Phosphonamide | 8.66 | 8.52 |

EXAMPLE 4

(a) To a round bottom flask was charged a total of 288 parts by weight of an ethoxylate (1.85 moles ethylene oxide) of a $C_{12}$–$C_{15}$ straight chain primary alcohol admixture having an average molecular weight of 209 and having the composition 5 percent $C_{11}$-alcohols, 25 percent $C_{12}$-alcohols, 30 percent $C_{13}$-alcohols, 30 percent $C_{14}$-alcohols and 10 percent $C_{15}$-alcohols. The ethoxylate was agitated at ambient temperature (20°–30° C.) while 153 parts of phosphorus oxychloride (1.0 mole) were dropped in over about 1.5 to 2.0 hours. After addition of phosphorus oxychloride was completed, the batch was heated to 60°–70° C. and held 1 hour. Dry nitrogen was bubbled into the vessel to purge it of HCl and the temperature was held one hour longer. Samples were taken at 1 hour intervals till percent chlorine on a hydrolyzed sample was theoretical for addition of 1 mole of the ethoxylated alcohol.

b. To a beaker equipped with agitator, two dropping funnels, thermometer and a pH meter were charged 500 ml. of water and 182 gms. of N,N-dimethyl-propylenediamine (1.8 mole). These materials were agitated at room temperature while 364 gms. of the chlorophosphonate (0.9 mole) prepared in (a) and 30 percent NaOH were dropped in simultaneously over about 1 to 1.5 hours at such a rate as to maintain the pH between 10.5 to 11.0. A total of 230 gms. of 30 percent NaOH was required. After all reactants were added, the batch was agitated 15 minutes at room temperature and then brought to pH 9.0 with CP HCl. A total of 22.0 gms. were required. The produce was then stripped of water at 40 mm. pressure and the residue was filtered. The yield was 402 gms. (83.3 percent of theoretical).

c. The phosphonamide formed above was applied from MeOH/CCl$_4$ (520 mls/100 mls) solvent mixture to Acrilan acrylic and Dacron polyester swatches at 1.25 percent application rate according to AATCC Standard Test Method 76–1959.

The swatches were conditioned at 72° F. and 50 percent relative humidity for at least 24 hours and the resistivity measured. Results were as follows:

|  | Log(Ohms/Square) | |
|---|---|---|
|  | Acrylic | Polyester |
| Control | 14.24 | 13.46 |
| Phosphonamide | 8.24 | 8.62 |

EXAMPLE 5 a. To round bottom flask was charged a total of 218 parts by weight of an ethoxylate (2.0 moles ethylene oxide) of 2-octanol. The ethoxylate was agitated at ambient temperature (20°–30° C.) while 77 parts of phosphorus oxychloride (0.5 mole) were dropped in over about 1.5 to 2.0 hours. After addition of phosphorus oxychloride was completed, the batch was heated to 60°–70° C. and held 1 hour. Dry nitrogen was bubbled into the vessel to purge it of HCl and the temperature was held 1 hour longer. Samples were taken at 1-hour intervals till percent chlorine on a hydrolyzed sample showed that two alcohol moieties had been substituted.

b. To a beaker equipped with agitator, two dropping funnels, thermometer and a pH meter were charged 500 ml. of water and 117 gms. of N,N-diethyl-propylenediamine (0.9 mole). These materials were agitated at room temperature while 466 gms. of the chlorophosphonate (0.9 mole) prepared in (a) and 30% NaOH were dropped in simultaneously over about 1 to 1.5 hours at such a rate as to maintain the pH between 10.5 to 11.0. A total of 130 gms. of 30% NaOH was required. After all reactants were added, the batch was agitated 15 minutes at room temperature and then brought to pH 9.0 with CP HCl. A total of 12.0 gms. were required. The product was then stripped of water at 40 mm. pressure and the residue was filtered. The yield was 453 gms. (82.3 percent of theoretical).

(c) The phosphonamide formed above was applied from MeOH/CCl$_4$ (520 mls/1000 mls.) solvent mixture to nylon faille and Dacron polyester swatches at a 1.25 percent application rate according to AATCC Standard Test Method 76–1959.

The swatches were conditioned at 72° F. and 50 percent relative humidity for at least 24 hours and the resistivity measured. Results were as follows:

|  | Log (Ohms/Square) | |
|---|---|---|
|  | Nylon | Polyester |
| Control | 14.02 | 13.46 |
| Phosphonamide | 8.74 | 8.70 |

What is claimed is:

1. A compound of the formula

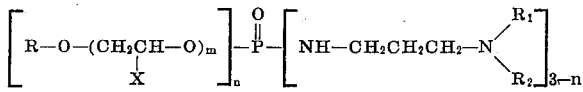

wherein R is an alkyl or alkylphenyl radical containing about seven to 18 carbon atoms, X is hydrogen, methyl or ethyl, $R_1$ and $R_2$ are individually alkyl or hydroxyalkyl containing one to three carbon atoms, $m$ is an integer from 1 to 10, and $n$ is 1 or 2.

2. The compound of claim 1 wherein R is an alkyl radical.

3. The compound of claim 1 wherein R is an alkyphenyl radical.

4. The compound of claim 1 wherein n is 2.

5. The compound of claim 1 wherein n is 1.

6. The compound of claim 1 wherein X is hydrogen.

7. The compound of claim 1 wherein $R_1$ and $R_2$ are individually methyl or ethyl.

8. The compound of claim 7 wherein X is H.

* * * * *